(12) United States Patent
Jeong

(10) Patent No.: US 6,373,027 B1
(45) Date of Patent: Apr. 16, 2002

(54) WELDING POSITIONING SYSTEM FOR SEAM WELDING

(75) Inventor: Jae-Ho Jeong, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/547,043

(22) Filed: Apr. 11, 2000

(30) Foreign Application Priority Data

Oct. 12, 1999 (KR) .............................................. 99-44100

(51) Int. Cl.[7] .............................. B21J 13/08; B23K 9/28; B23K 1/14
(52) U.S. Cl. ..................... 219/158; 219/86.24; 228/49.4
(58) Field of Search ................................ 219/158, 161, 219/159, 162, 86.24, 83; 228/4.1, 49.1, 44.3, 49.4

(56) References Cited

U.S. PATENT DOCUMENTS

| | | | | |
|---|---|---|---|---|
| 3,624,341 A | * | 11/1971 | Hazelhurst .............. | 219/117 R |
| 3,904,845 A | * | 9/1975 | Minkiewicz ................ | 219/124 |
| 4,236,060 A | * | 11/1980 | Butz ....................... | 219/125.1 |
| 4,625,091 A | * | 11/1986 | Smyers et al. ........... | 219/86.24 |
| 4,639,574 A | * | 1/1987 | Arnoldt et al. .......... | 219/125.1 |
| 4,652,718 A | * | 3/1987 | Fujita et al. ................ | 219/82 |
| 4,652,719 A | * | 3/1987 | Fujita et al. ................ | 219/82 |
| 4,711,436 A | * | 12/1987 | Kobuck et al. .............. | 269/40 |
| 5,364,006 A | * | 11/1994 | Gilles et al. ................ | 228/4.1 |
| 5,605,275 A | * | 2/1997 | Rintala ..................... | 228/49.4 |
| 5,749,511 A | * | 5/1998 | Aebersold et al. ......... | 228/212 |
| 6,222,151 B1 | * | 4/2001 | Ziolkowski et al. ....... | 219/86.1 |

* cited by examiner

*Primary Examiner*—Tom Dunn
*Assistant Examiner*—Zidia Pittman
(74) *Attorney, Agent, or Firm*—Birch, Stewart, Kolasch & Birch, LLP

(57) ABSTRACT

A welding positioning system for seam welding adapted to to simplify a positioning determination of welding portion, thereby reducing working hours for taking the positioning determination and to automatically adjust the degree of lapped portion according to thickness of metal plate, thereby reducing adjusting time and to automatically accord the center line of welding, thereby improving a welded quality, the system comprising: a stopper vertically moving according to the center line of welding to adjust the degree of lapped portion at left and right metal plates; left and right hinge brackets rotatably mounted at a hinge axis at one side thereof in order to rotate within a predetermined range the metal plates inserted into the left and right sides of the stopper; and a pair of left and right clamps mounted at one side of the left and right hinge brackets for moving vertically to fix the metal plates.

5 Claims, 3 Drawing Sheets

WELDING POSITIONING SYSTEM FOR SEAM WELDING

BACKGROUND OF THE INVENTION

1. Field of the Invention

The present invention relates to a welding positioning system for lapping a welding part of a metal plate for seam welding, and more particularly to a welding positioning system for seam welding, the system adapted to maintain a lapped portion of the metal plate at a constant level and to expedite a positioning decision of a panel, thereby shortening working hours.

2. Description of the Prior Art

Generally, a seam welding is a kind of electric resistance welding primarily used for seam welding of a metal plate, where, welding parts of the metal plate are lapped into which a pair of rollers comprising electrodes are inserted, allowing the lapped welding parts to be welded by rotation of the rollers.

The welded parts of the metal plate thus welded by the seam welding are determined in welding positions thereof by a welding positioning system, and lapped portions thereof are also determined at this time. Positions and lapped portion of the welding parts greatly influence the quality of the welding.

FIGS. 1, 2 and 3 are schematic drawings for illustrating methods for determining the positions of welding by way of the welding positioning system according to the prior art.

The welding positioning system includes left and right clamps 2 and 4 for vertical movement, left and right stoppers 6 and 8 slidably inserted into the left and right clamps 2 and 4 and left and right cylinders 10 and 12 for actuating left and right stoppers 6 and 8.

As illustrated in FIG. 1, the stopper 6 is advanced by actuation of the left cylinder 10 in a state where the left clamp 2 is lowered. At this time, advanced distance of the left stopper 6 is adjusted by adjustment of an adjuster 14 mounted at a rear side of the left cylinder 10. Successively, the right clamp 4 is raised to insert a right metal plate 18 downward of the raised right clamp 4. The right metal plate 18 is inserted upto the left stopper 6.

Successively, as illustrated in FIG. 2, the right clamp 4 is lowered to fix the right metal plate 18, and the right stopper 8 is pushed by the right cylinder 12 to advance.

At this time, advanced distance of the right stopper 8 is adjusted by adjustment of an adjuster 16 mounted at a rear side of the right cylinder 12. Then, the left clamp 2 is raised to insert a left metal plate 20 thereunder. The left metal plate 20 is pushed upto the right stopper 8.

At next stage, as illustrated in FIG. 3, the left clamp 2 is lowered to fix the left metal plate 20. A welding part where the left and right metal plates 20 and 18 are lapped is advanced by roll electrode 22 for welding.

However, there is a problem in the welding positioning system thus described according to the prior art in that many steps are involved in determining the welding positions of the metal plates to thereby lengthening the position determining time.

There is another problem in that each adjuster should be individually adjusted in order to adjust the degree of lapped portion because the degree of lapped portion should be adjusted according to thickness of the metal plate, thereby taking a lot of working hours. There is still another problem in that the degree of lapped portion is varied according to individual adjustment of each adjuster, resulting in disaccorded center line of welding and generation of bad welding.

SUMMARY OF THE INVENTION

The present invention is disclosed to solve the aforementioned problems and it is one object of the present invention to provide a welding positioning system for seam welding adapted to simplify a positioning determination of welding portion, thereby reducing working hours for taking the positioning determination.

It is another object of the present invention to provide a welding positioning system for seam welding adapted to automatically adjust the degree of lapped portion according to thickness of metal plate, thereby reducing adjusting time.

It is still another object of the present invention to provide a welding positioning system for seam welding adapted to automatically accord the center line of welding, thereby improving a welded quality.

In accordance with the objects of the present invention, there is provided a welding positioning system for seam welding, the system comprising:

a stopper vertically moving according to the center line of welding to adjust the degree of lapped portion at left and right metal plates;

left and right hinge brackets rotatably mounted at a hinge axis at one side thereof in order to rotate within a predetermined range the metal plates inserted into the left and right sides of the stopper; and a pair of left and right clamps mounted at one side of the left and right hinge brackets for moving vertically to fix the metal plates.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Preferred embodiment of the present invention will now be described in detail with reference to the accompanying drawings.

Figure 1:
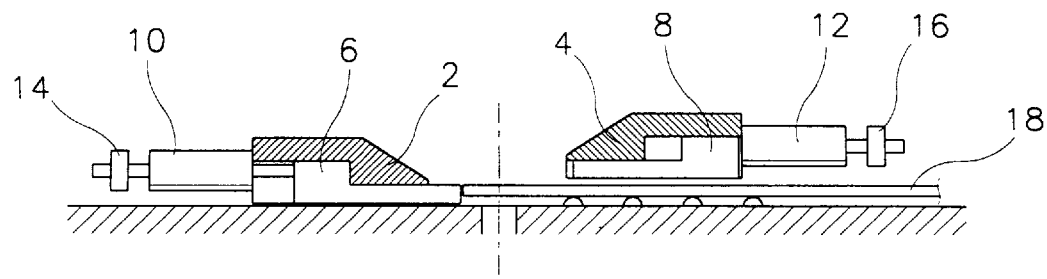
FIGS. 1, 2 and 3 are operational constitutional diagrams of welding positioning system according to the prior art.
Figure 2:
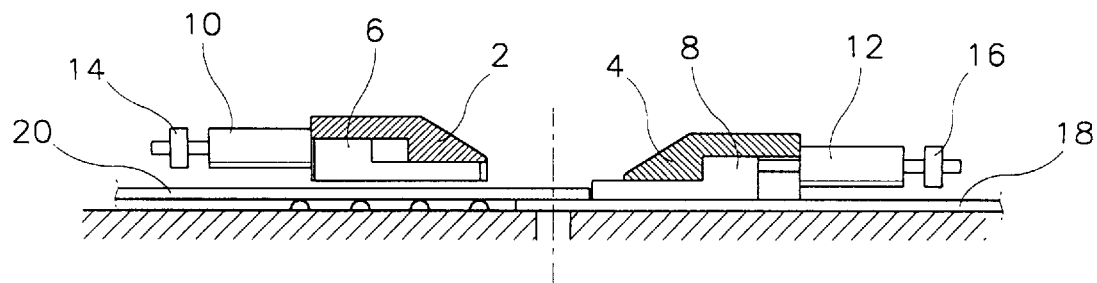
Figure 3:
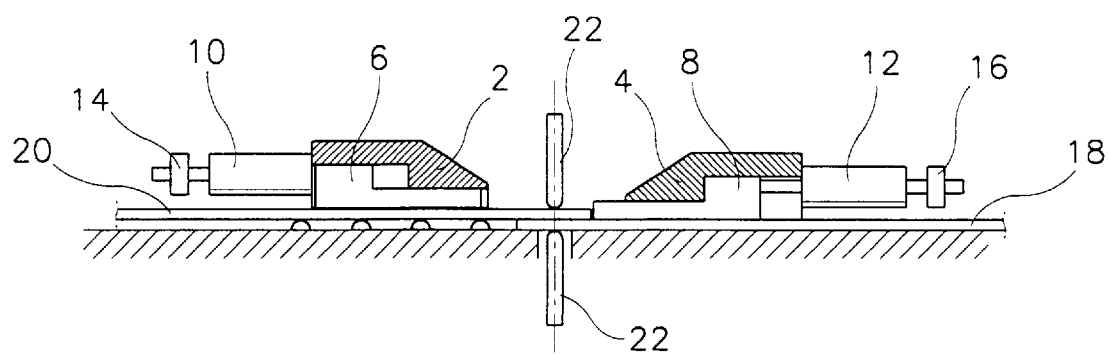
Figure 4:
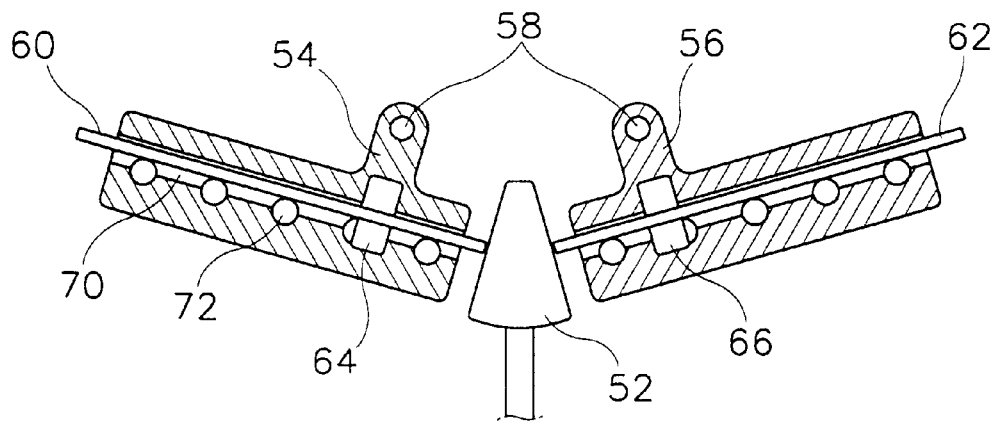
FIG. 4 is a side view of a welding positioning system according to the present invention.

FIG. 4 is a side view of a welding positioning system according to the present invention.

The welding positioning system includes a stopper 52 vertically moving according to the center line of welding to adjust the degree of lapped portion at left and right metal plates 60 and 62, left and right hinge brackets 54 and 56 rotatably mounted at a hinge axis 58 at one side thereof in order to rotate within a predetermined range the metal plates 60 and 62 inserted into the left and right sides of the stopper 52 and a pair of left and right clamps 64 and 66 mounted at one side of the left and right hinge brackets 54 and 56 for moving vertically to fix the metal plates 60 and 62.

The stopper 62 is widened with a predetermined angle as it goes underneath, and is connected at a lower end thereof to an actuating mechanism in order to move vertically at the center line (T) of welding. The actuating mechanism may be a cylinder, actuator or anything that moves the stopper vertically.

The left and right hinge brackets 54 and 56 is rotatably mounted at one upper side thereof to the hinge axis 58 and is laterally formed with a tunnel 70 for the left and right metal plates 60 and 62 to be inserted thereinto. The tunnel 70 is disposed thereunder with a plurality of rollers 72 for guiding the metal plates 60 and 62.

One of the left and right hinge brackets is fixed to the hinge axis 58 and the other is made to enable the hinge axis 58 to move vertically so as to adjust a portion lapped by variation of thickness of the left and right metal plates 60 and 62. The left and right clamps 64 and 66 are respectively mounted to one side of the left and right hinge brackets 54 and 56 to fix the left and right metal plates 60 and 62 inserted into the tunnel 70.

Now, operations of welding positioning system thus constructed will be described.

Figure 5:
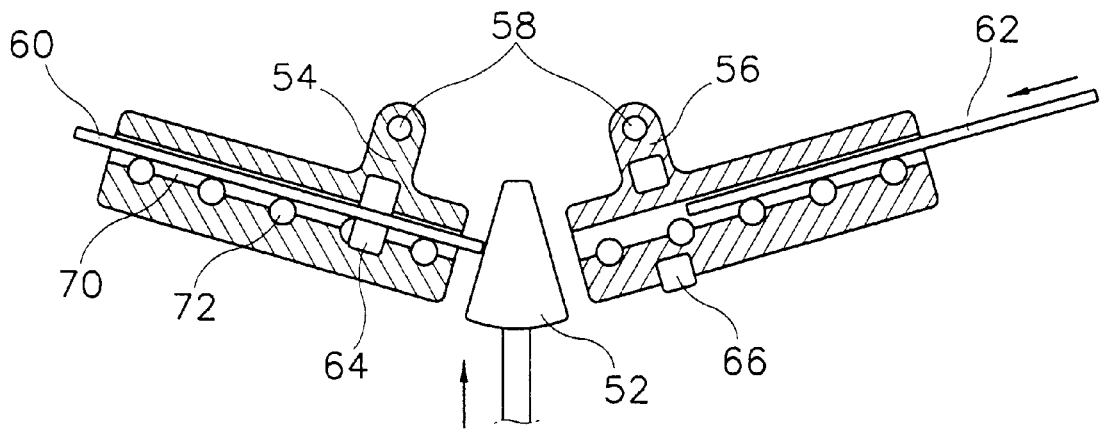
FIGS. 5 and 6 are usage constitutional diagrams of welding positioning system according to the present invention.
Figure 6:
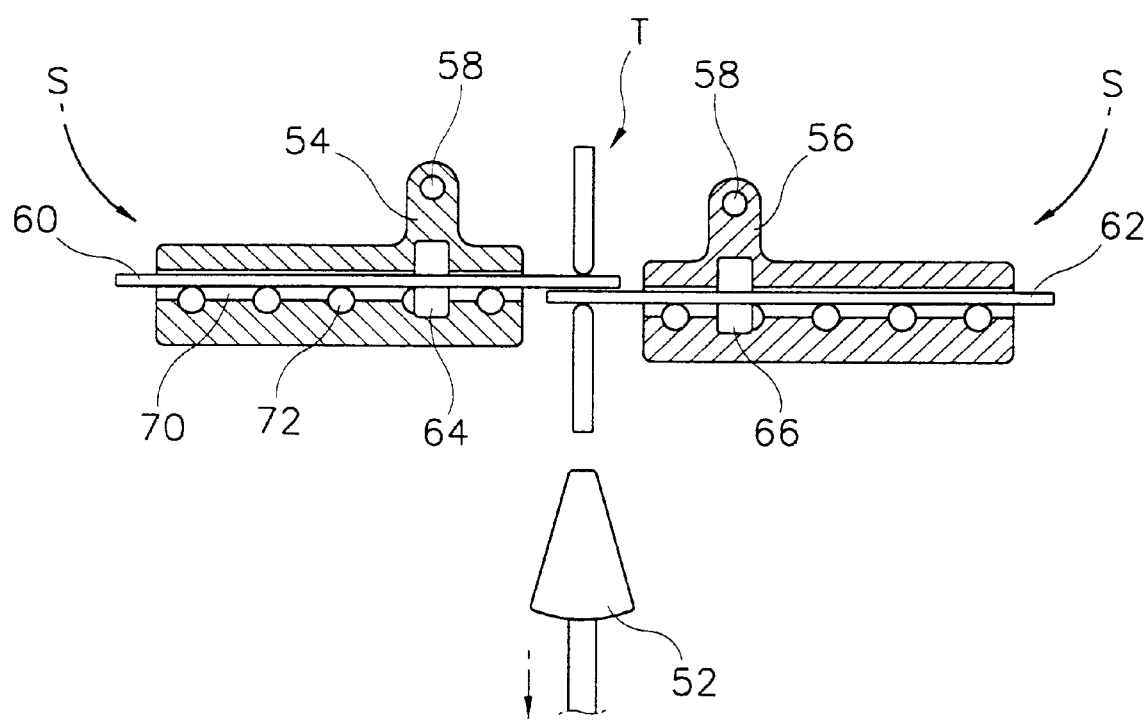

FIGS. 5 and 6 are side views for illustrating operational state of the welding positioning system. As illustrated in FIG. 5, the stopper 52 is lifted up to a predetermined level according to the center line (T) of welding while the left and right hinge brackets 54 and 56 are tilted at a predetermined angle. The left and right metal plates 60 and 62 are inserted into the tunnel 70 of the tilted left and right hinge brackets 54 and 56. Successively, the metal plates 60 and 62 are placed above the roller 72 by gravity and side surfaces to be welded contact a side surface of the stopper 52 respectively. At this time, left and right clamps 64 and 66 are widened upwardly, not to have influence on the insertion of the metal plates 60 and 62.

As illustrated in FIG. 6, the left and right clamps 64 and 66 are then made to contact upper and lower side surfaces of the left and right metal plates 60 and 62 to respectively fix the left and right metal plates 60 and 62 and to lower the stopper 52. Successively, when the left and right hinge brackets 54 and 56 are respectively rotated toward the arrow direction (S), a welding portion, where the left and right metal plates 60 and 62 are lapped, is provided. The roller electrode 78 is lowered to be touched at the upper and lower sides of the welding portion for welding.

At this time, when the thickness of the metal plates 60 and 62 varies, heights of the lifting hinge brackets 54 and 56 are adjusted to adjust the position of the lapped portion according to the thickness of the metal plates 60 and 62.

Furthermore, the degree of lapping by the left and right metal plates 60 and 62 should change according to the thickness of the metal plates 60 and 62, and when the thickness of the metal plates is changed, moving distance of the stopper 52 is adjusted accordingly.

In other words, when the thickness of the metal plates 60 and 62 is increased, ascending distance of the stopper 52 is shortened, such that when metal plates 60 and 62 contact a narrow portion of the stopper 56, the degree of lapping is increased. Conversely, when the thickness of the metal plates 60 and 62 is tinned, the moving distance of the stopper 56 is lengthened to allow the metal plates to touch a broad portion of the stopper, thereby decreasing the degree of lapping.

As apparent from the foregoing, there is an advantage in the welding positioning system for seam welding thus constructed and operated according to the present invention in that lifting distance of the stopper is adjusted according to change of the thickness of metal plates to automatically adjust the degree of lapping, thereby simplifying the operation and shortening the working hours.

There is another advantage in that the stopper is lifted along the center line of welding to be accorded with lapped center line of the metal plates, thereby enabling a constant welding for improved quality of welding.

What is claimed is:

1. A welding positioning system for seam welding, the system comprising:

a stopper vertically moving according to the center line of welding to adjust the degree of lapped portion at left and right plates;

left and right hinge brackets rotatably mounted at a hinge axis at one side thereof in order to rotate within a predetermined range the metal plates inserted into the left and right sides of the stopper; and a pair of left and right clamps mounted at one side of the left and right hinge brackets for moving vertically to fix the metal plates and rotatable through said predetermined range.

2. The system as defined in claim 1, wherein the stopper is moved along a center line of welding and is widened as it goes thereunder with a predetermined angle, the stopper being connected to an actuator at a lower side thereof.

3. The system as defined in claim 1, wherein the left and right hinge brackets are lengthwise formed with a tunnel for a panel to be inserted thereinto, the tunnel being disposed thereunder with a plurality of rollers for easy insertion of the metal plates.

4. The system as defined in claim 1, wherein the left and right clamps are respectively mounted to upper and lower sides of the left and right hinge brackets about a tunnel to thereby fix the metal plates to be inserted into the tunnel.

5. The system as defined in claim 1, wherein one of the left and right hinge brackets is formed with the hinge axis fixed not to move while the other is made to enable the hinge axis to move vertically so as to adjust a portion lapped by variation of thickness of left and right metal plates.

* * * * *